United States Patent [19]

Taylor et al.

[11] 4,397,299
[45] Aug. 9, 1983

[54] DEEP FAT FRYER

[75] Inventors: Cecil K. Taylor, Crownsville; Gerald W. Sank, Pasadena, both of Md.

[73] Assignee: Vulcan-Hart Corporation, Baltimore, Md.

[21] Appl. No.: 254,316

[22] Filed: Apr. 15, 1981

[51] Int. Cl.³ .................. A47J 37/12; A47J 27/00
[52] U.S. Cl. ............................ 126/391; 126/357; 126/343.5 A; 99/403
[58] Field of Search ............... 126/357, 350 R, 391, 126/390, 343.5 A, 343.5 R; 99/403, 339; 122/50, 44 A, 116, 23; 431/326, 328

[56] References Cited

U.S. PATENT DOCUMENTS

| | | | |
|---|---|---|---|
| 1,620,952 | 3/1927 | Davies | 126/343.5 A |
| 2,543,835 | 3/1951 | Dewey et al. | 126/391 |
| 2,997,941 | 8/1961 | Phelan et al. | 99/332 |
| 3,060,922 | 10/1962 | Wilson | 126/391 |
| 3,671,174 | 6/1972 | Reid, Jr. | 431/326 |
| 3,712,289 | 1/1973 | Reid, Jr. et al. | 126/391 |
| 3,960,137 | 6/1976 | Schmid | 99/403 X |

FOREIGN PATENT DOCUMENTS 389182  3/1933  United Kingdom .................. 99/403

OTHER PUBLICATIONS

A.G.A.L. Laboratories Publication, Cleveland, Ohio, Sep. 25, 1979, "Deep Fat Fryers".

Gas Research Institute Publication, Chicago, Illinois, Jan. 1980, "Annual Report for 1979".

Primary Examiner—Samuel Scott
Assistant Examiner—Randall L. Green
Attorney, Agent, or Firm—Nathaniel A. Humphries

[57] ABSTRACT

A deep-fat fryer has a tank of inverted U-shaped configuration formed in either a single compartment or divided into two compartments by a medial divider formed of two parallel spaced panels with an insulated space between the panels; first and second infrared type gas burners are positioned facingly adjacent inner walls of the lower side portions of the vat and receive a measured amount of pressurized combustion air which is mixed with fuel gas to heat radiant tile elements of the burner to radiate heat against the vat walls with the combustion air being substantially less than that of conventional systems so that it is substantially no more than the minimum amount necessary to complete combustion. Flue gas is exhausted upwardly along side flue means to an upper horizontal gas discharge passageway extending beneath the upper portion of the vat to a vertical flue housing at the rear of the assembly with vanes provided in the gas discharge path for conducting heat to the vat. Either the single compartment or both compartments of the divided vat or one compartment of the divided vat can be heated by actuating either one or both of the infrared gas burner assemblies.

16 Claims, 10 Drawing Figures

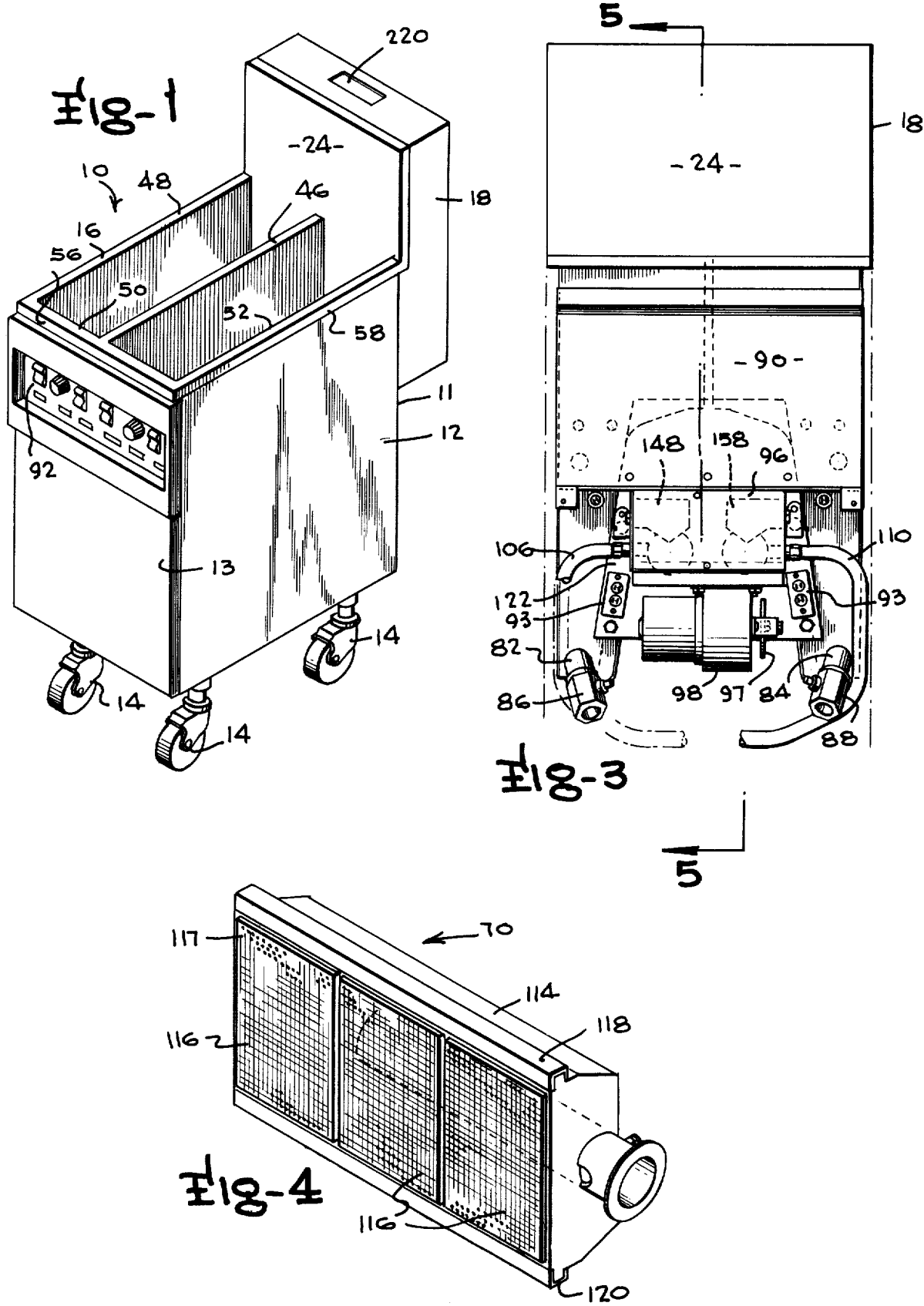

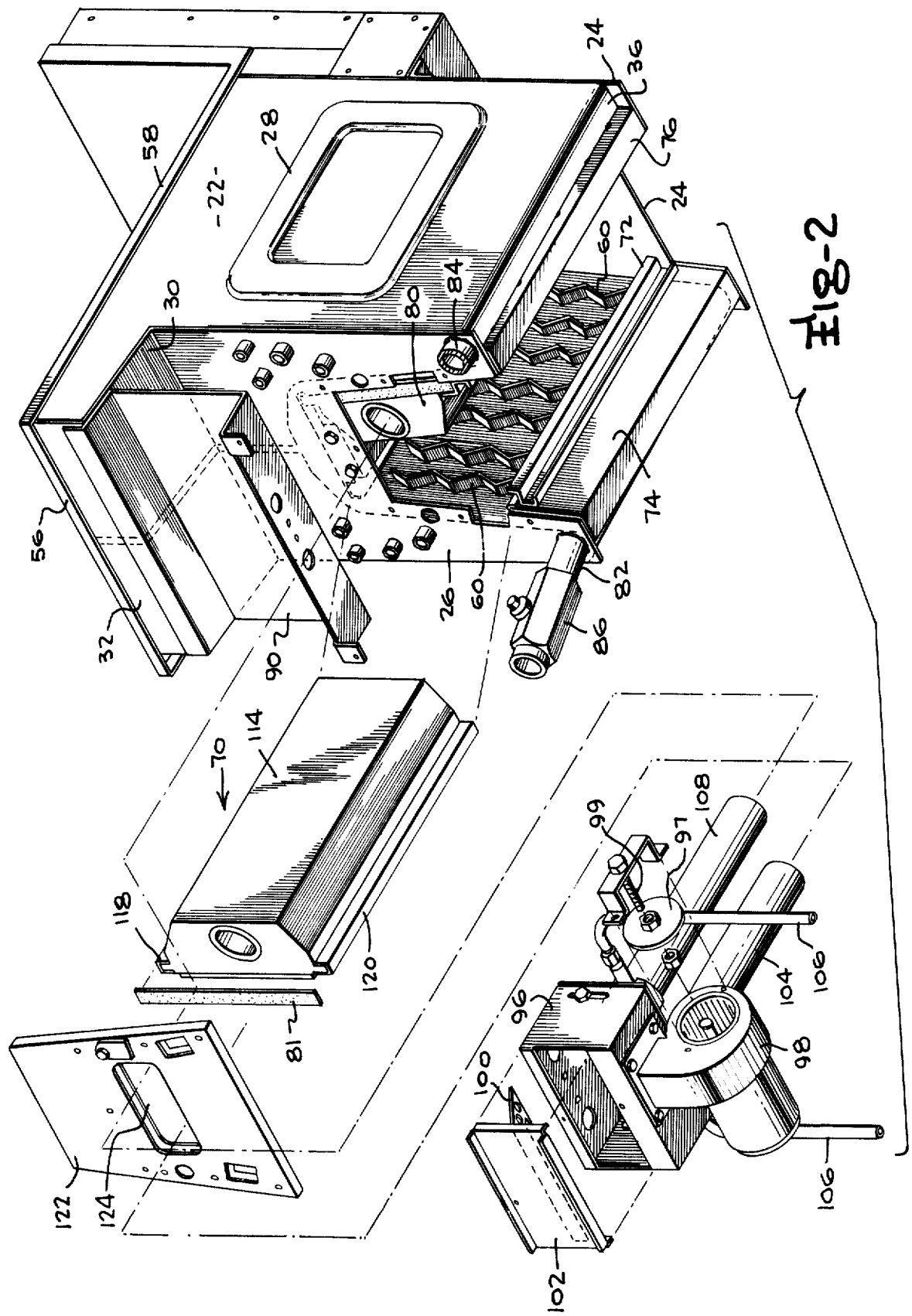

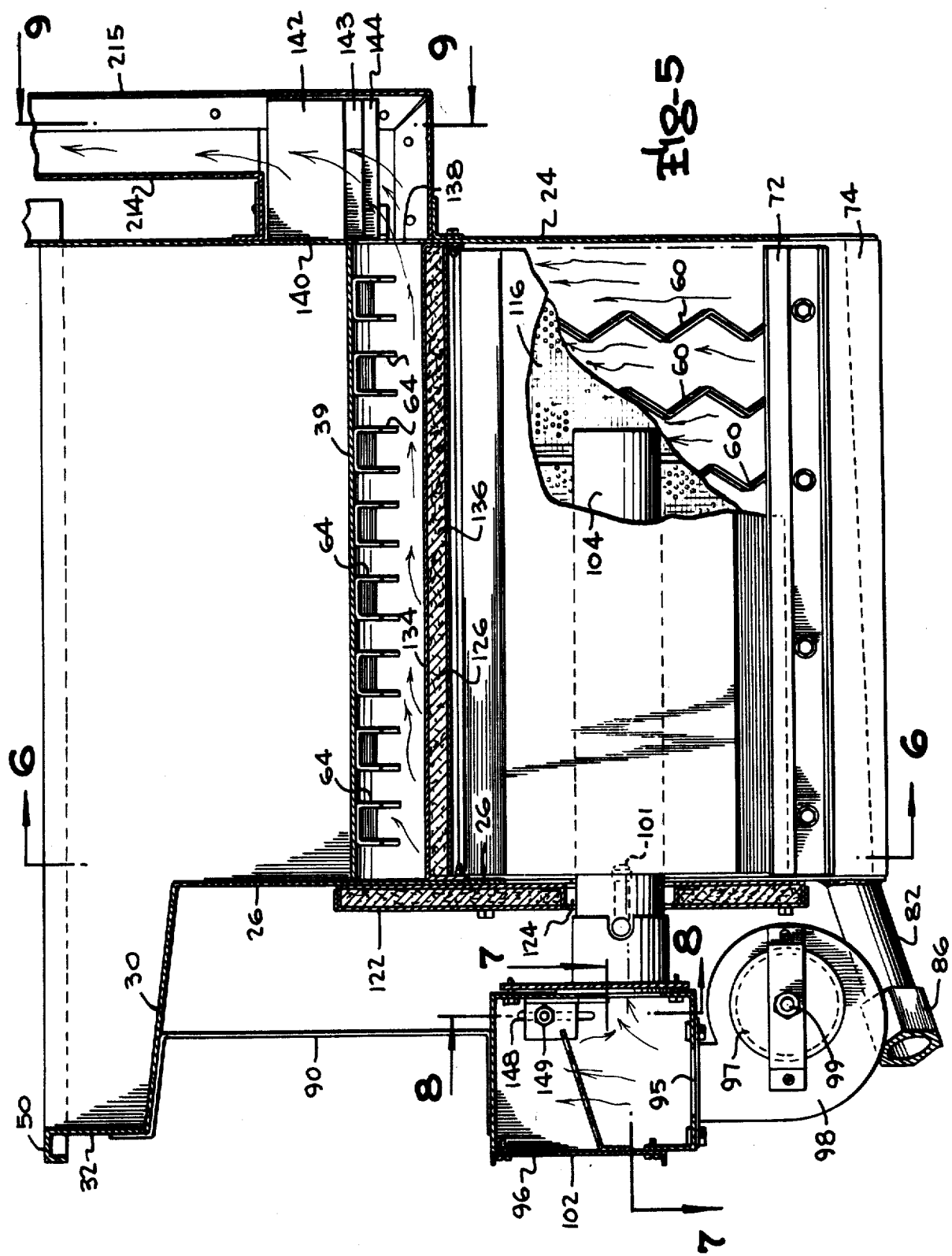

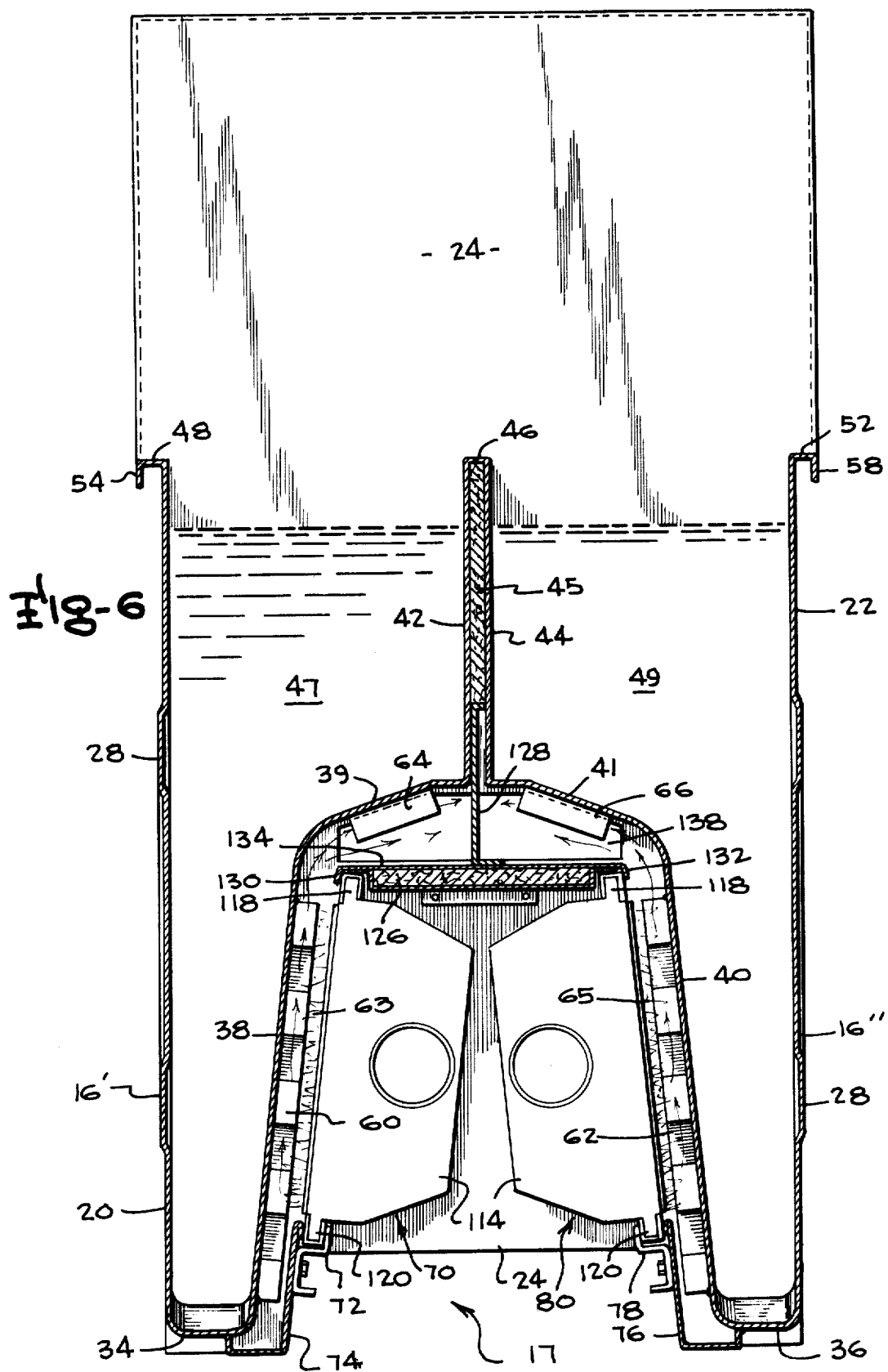

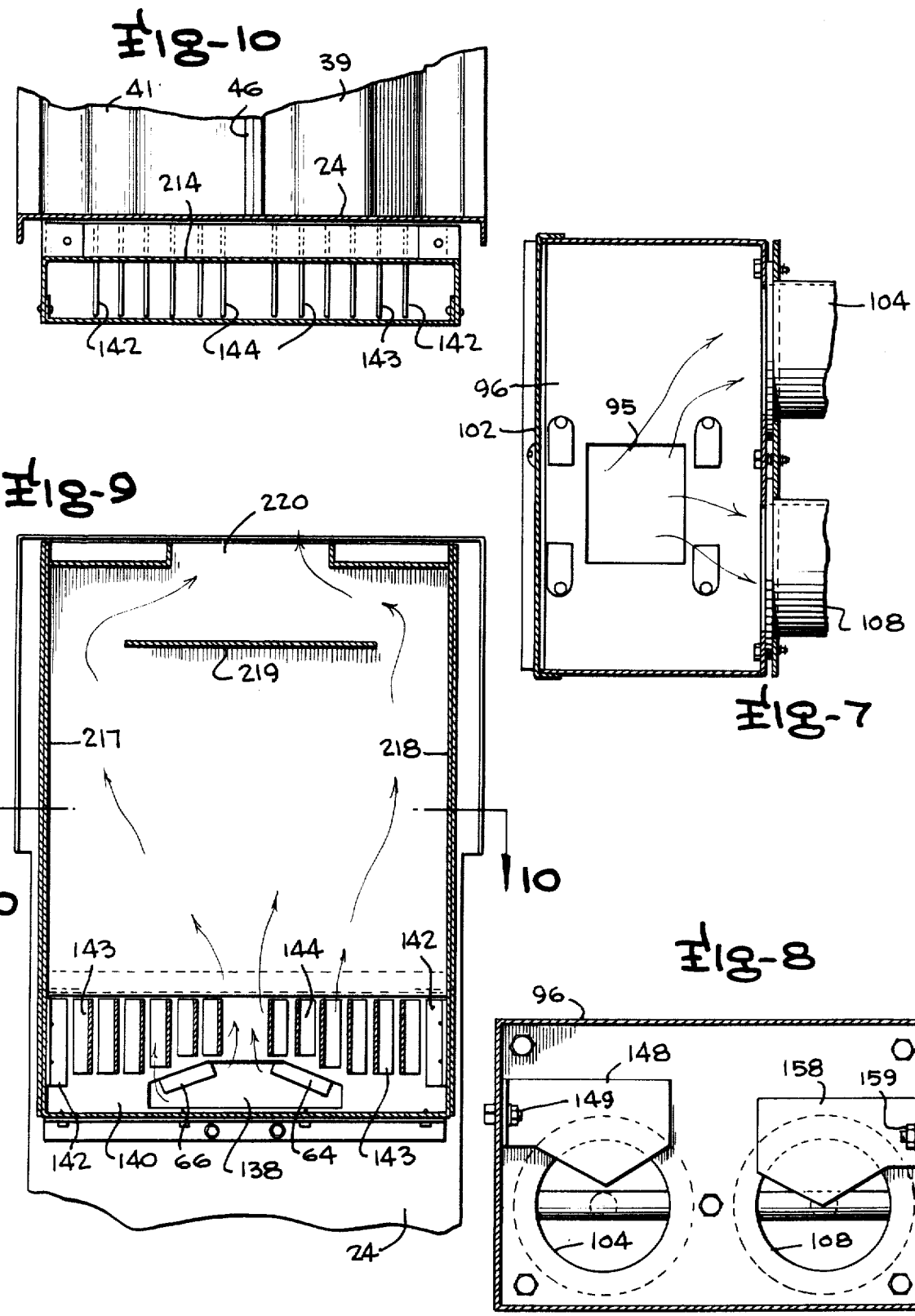

DEEP FAT FRYER

BACKGROUND OF THE INVENTION

This invention is in the field of food cooking apparatus and is more particularly directed to the field of deep-fat fryers.

Previously known deep-fat fryers such as those in U.S. Pat. Nos. 3,217,633; 3,217,704; 3,363,541; 3,671,174; 3,712,289, and 3,760,793 have been provided with conventional bunsen burners in which the ambient atmosphere supplies an excess abundance of combustion air with the gaseous products of combustion and excess combustion air being exhausted past the outer surface of the vat to effect a transfer of heat to the vat so as to heat the cooking oil contents thereof. Devices of the foregoing type have proven to be generally satisfactory and have provided an efficiency of approximately 40 percent during normal operation. Although 40 percent efficiency was considered to be satisfactory in the days of abundant and inexpensive combustion gas, the ever increasing cost of combustion gas has in recent years greatly increased the cost of operating such conventional gas burner heated deep-fat fryers.

Another problem with prior known deep fat fryers is that it is necessary to heat all of the cooking oil in the cooking vat in order to cook even small quantities of food so that there is a substantial expense of operation when cooking such small food quantities. Split vat fryers have consequently been sold by a number of manufacturers. However, most restaurants and fast food service outlets have widely fluctuating needs in terms of cooking capacity and it is therefore necessary to have relatively large units which are frequently uneconomical to operate when cooking small quantities of food. It is also well known that different foods require different cooking temperatures and that the same cooking oil should not be used for cooking certain different types of food. Consequently, many commercial establishments find it necessary to have two or more deep fat cooking units or to have large conventional split vat fryers.

Therefore, it is a primary object of this invention to provide a new and improved deep-fat fryer overcoming one or more of the foregoing shortcomings of the prior art devices.

A more specific object of the present invention is to provide a new and improved apparatus and method for cooking with a deep-fat fryer operation heated by gaseous fuel.

Achievement of the foregoing objects is enabled through the preferred embodiment of the invention in which a cooking vat is provided with cooking oil on its interior with pressurized infrared type gas burners adjacent the exterior surface of inwardly facing vertical internal walls of a tunnel extending through the lower portion of the vat for heating the cooking oil contents thereof. The gas burners are connected to a source of pressurized combustion air and a source of combustion gas with the amount of combustion air being metered so as to provide a minimal amount of air substantially no more than that required for efficient combustion of the gas; consequently, the system operates without any substantial amount of excess combustion air absorbing heat from the combustion process so as to reduce the overall efficiency of the system. The specific burner system employed includes two burners each of which has porous ceramic tile members having a large number of small apertures through which the precisely measured mixture of combustion air and gaseous fuel passes for surface combustion adjacent the tile outer surface which faces the inner walls of the vat. The ceramic member is being heated by the combustion so that its outer surface reaches a temperature sufficient to provide radiant heat which impinges on the surface of the inner walls of the vat. Additionally, the gaseous products of combustion are vented along substantial surfaces of the vat so that heat is absorbed from the gaseous products of combustion to provide a further increase in the efficiency of the system.

The vat employed in the preferred embodiment is in the form of an inverted-U-shaped configuration as viewed from the front so as to have two downwardly extending side leg portions between which a tunnel extends from front to rear with the burners being mounted inside the tunnel facing vertical surfaces of the inner walls of the tunnel. A divider consisting of two spaced parallel divider panels divides the vat into two compartments each of which is capable of being heated by one of the two gas burners. It is consequently possible for the vat to be operated at only half of its maximum capacity when only one of the burners is used. It is also possible for both compartments of the vat to be operated at different temperatures. The divider panels are separated by an air space so as to prevent the conductive heat flow from one of the compartments to the other compartment when only one of the compartments is being used. In an alternative embodiment, the divider wall is eliminated so that only a single working compartment is provided.

A better understanding of the different embodiments of the invention will be enabled when the following detailed description is considered in conjunction with the appended drawings in which like reference numerals are used for the same parts of the apparatus as illustrated in the different drawing figures.

BRIEF DESCRIPTION OF THE DRAWING

FIG. 1 is a perspective view of the preferred embodiment of the invention;

FIG. 2 is an exploded perspective view of the internal components of the preferred embodiment as viewed from a 45° position forward of and below the components thereof;

FIG. 3 is a rear elevation view of the internal components of the preferred embodiment;

FIG. 4 is a perspective view of one of the infrared type burners employed in the preferred embodiment;

FIG. 5 is a sectional view taken along lines 5—5 of FIG. 3 with portions being removed for purposes of illustration;

FIG. 6 is a sectional view taken along lines 6—6 of FIG. 5;

FIG. 7 is a sectional view taken along lines 7—7 of FIG. 5;

FIG. 8 is a sectional view taken along lines 8—8 of FIG. 5;

FIG. 9 is a sectional view taken along lines 9—9 of FIG. 5; and

FIG. 10 is a sectional view taken along lines 10—10 of FIG. 9.

DESCRIPTION OF THE PREFERRED EMBODIMENT

FIG. 1 of the drawings illustrates the preferred embodiment of the invention, generally designated 10, which consists of a deep-fat fryer including a housing 11 formed of metal and having fixed side panels 12 and a full opening door 13 with the housing being supported on legs or, for mobility, on casters 14. An open-topped vat 16 is supported in the upper portion of the housing with the rear portion of the device consisting of a flue box assembly 18.

Vat 16 is of generally inverted U-shaped configuration including side "leg" portions 16' and 16" separated by a tunnel 17 as shown in FIG. 6. Vat 16 includes a left side wall 20 (FIG. 6) and a right side wall 22 with the rear portion of the vat being defined by a rear wall 24 (FIG. 5) and the front portion being defined by an inverted U-shaped front wall 26 (FIG. 2). It should be observed that the side walls 20 and 22 are provided with rectangular protrusions 28 for stiffening so as to prevent undesirable flexing. Additionally, vat 16 includes a shallow forwardly extending drain shelf formed of a slightly sloping panel 30 with the forward end of the vat comprising a vertical panel 32 as best shown in FIG. 5. Bottom wall panels 34 and 36 are respectively welded to the left and right side walls 20 and 22 and slope downwardly from front to rear as best shown in FIG. 6. An internal left wall 38 and an internal right wall 40 are welded to the inner edges of the bottom wall panels 34 and 36. The walls 38 and 40 have inwardly extending upper portions 39 and 41 which are welded respectively to spaced parallel divider panels 42 and 44 connected by a horizontal top panel 46 so as to divide the vat into left and right compartments 47 and 49 as clearly shown in FIG. 6. A layer of insulation 45 is provided between the divider panels 42 and 44.

The horizontal top panel 46 is continuous with upper surfaces of border panels 48, 50, and 52 extending outwardly respectively from side wall 20, vertical panel 32 and side wall 22 with downwardly extending stiffener flanges 54, 56, and 58 being connected respectively to border panels 48, 50, and 52. It will consequently be seen that the front to rear extending internal tunnel 17 is open adjacent its forward end but is closed by rear wall 24 which serves a purpose to be discussed in detail hereinafter. The vat is preferably formed of 409 series stainless steel which provides enhanced thermal conductivity as compared to previously employed stainless steels used in the fabrication of deep-fat fryer tanks or vats; however, other conventional steel or other metals could be employed for forming the vat if desired. A plurality of vertically extending undulating heat absorbing baffle fin members 60 extend outwardly from internal left wall 38 while similar baffle members 62 extend outwardly from the internal right wall 40 as shown in FIG. 6. Additionally, downwardly facing channel-shaped heat absorbing baffles 64 and 66 respectively extend downwardly from the lower surface of inwardly inclined portions 39 and 41 of the internal left wall 38 and internal right wall 40. A coating of infrared absorbing black material such as manganese dioxide or silicone mixture is applied to all of the fins and surfaces 38, 40, etc. on which they are mounted to increase their infrared absorption capacity.

A left burner, generally designated 70, is supported along a lower edge surface by an elongated clamp member 72 bolted to a combustion chamber closure fitting 74 welded to the lower surface of bottom wall panel 34 and extending from front to rear between the front wall 26 and rear wall 24. A similar combustion chamber closure fitting 76 is welded to the bottom wall panel 36 and has an elongated clamp member 78 attached to its inwardly facing surface for providing support for a second or right burner member 80. Seal means 81 is extended about the periphery of each burner member as shown in FIG. 2.

Drain pipes 82 and 84 extend outwardly through the front wall 26 and respectively have valve means 86 and 88 for permitting selective closure and opening for effecting the draining of the tank contents from the left and right chambers of the tank in an individual manner.

A control box rear closure member 90 (FIG. 2) is positioned below the sloping panel 30 and vertical panel 32 and extends downwardly to receive a control panel housing 92 in which all of the control elements for the device are mounted. The control elements include conventional variable thermostat means and switch means for actuating conventional electronic gas ignition devices 93 associated with each of the burners 70 and 80. Additionally, a blower manifold plenum 96 having an opening 95 connected to the output of an electric motor powered blower 98 is positioned in the housing for receiving pressurized air from the blower with an internal baffle 100 being mounted on a removable cover plate 102 serving to dampen pressure fluctuations in the blower manifold plenum. The blower plenum box provides combustion air to the burners and also provides cooling air through holes in the top of plenum 96 aligned with the holes in member 90 to the control panel housing components to prevent their damage.

The amount of air flowing into the blower manifold plenum can be adjusted by positioning a movable disc shutter 97 mounted on a bracket supported threaded bolt 99 in front of the blower inlet as shown in FIGS. 2 and 5; adjustment of disc shutter 97 inwardly and outwardly relative to the blower inlet respectively reduces or increases the air flow into the blower. A left venturi tube 104 extends outwardly from the blower manifold plenum 96 into the interior of the left burner assembly 70 with a gas line 106 being connected to an orifice nozzle 101 on the interior of tube 104 so that pressurized gas and air are mixed in tube 104 for injection into the left burner 70. Similarly, a right venturi tube 108 is also connected to the manifold plenum 96 and a gas line 110 and extends into the right burner assembly 80 in the same manner. Burners 70 and 80 and venturi tubes 104 and 108, etc. are of basically conventional operation and structure and are manufactured by Solaronics Inc. of Rochester, Mich. A flat shutter 148 is mounted for vertical adjustment in front of venturi tube 104 inside plenum 96 by nut and bolt means 149 extending through a slot 150 in the wall of the plenum so that vertical adjustment of shutter 148 causes it to block venturi tube 104 to varying degrees to adjust the amount of air that can flow into the tube. A similar shutter 158 is mounted on nut and bolt means 159 for vertical adjustment in front of venturi tube 108 for the same purpose.

Burners 70 and 80 are of identical construction with each consisting of a hollow, sealed, airtight metal housing 114 having a planar burner face consisting of three perforated tile members 116 through which the gas and air flows with combustion occurring adjacent the outer surfaces of the tile members. Upper and lower retainer ribs 118 and 120 are provided in housing 114 with it being observed that the lower ribs 120 of the left and right burners are received in the clamp members 72 and 78 respectively. A vertical side draft chamber 63 is provided between the tiles of heater 70 and wall 38 and a similar vertical side draft chamber 65 is provided between the tiles of burner 80 and wall 40. The hollow housing 114 receives the mixture of gaseous fuel and air which is at a pressure of approximately 4" water column pressure. The combustible mixture passes through the porous tile members and is ignited at the outer surface thereof so that the tile members are heated to a relatively high temperature. The amount of combustion air provided is only slightly in excess of that necessary for complete combustion with there being no appreciable extra combustion air injected into the system.

It should be observed that a metal-clad insulation panel 122 is provided adjacent the outer surface of front wall 26 and has an aperture 124 through which the left venturi tube 104 and the right venturi tube 108 extend. Similarly, a generally horizontal insulation panel 126 is mounted in a metal housing connected to a baffle plate 128 and supported at its front and rear edges by walls 26 and 24 respectively. Downwardly extending side flanges 130 and 132 define downwardly facing slots in which the upper retainer ribs 118 of the respective heater members 78 and 80 are received. The housing in which the horizontal insulation panel 126 is mounted also includes an upper metal sheet 134 and a lower metal sheet 136 with the side flanges 130 and 132 being provided in the upper metal sheet. The insulation panel 126 is sandwiched between sheets 134 and 136. The space above upper metal sheet 134 and below upper portions 39 and 41 comprises a generally horizontal flue gas discharge passageway which has its side edges in communication with the upper edges of side draft chambers 63 and 65 consisting of the space between inner walls 38 and 40 and their associated burner assemblies 70 and 80.

A flue gas discharge opening 138 is provided in the rear wall 24 for permitting the passage of flue gas outwardly from the horizontal flue gas discharge passageway into a stack base chamber 140 which encloses a plurality of heat absorbing fins 142, 143, 144 of different vertical dimensions welded to and extending rearwardly of the rear face of the rear wall 24 as best shown in FIGS. 5, 8, and 9. A vertical flue defined between a front wall 214 and a rear wall 215 (FIG. 5) and side walls 217 and 218 includes an internal baffle 219 above the fins 142, 143, and 144 for preventing flame from escaping from the rear flue stack top opening 20 in the event of delayed ignition. Final discharge of the flue gas occurs upwardly through opening 220.

In operation, the blower 98 is operated and gaseous fuel is supplied through lines 106 and 110 to be mixed with the combustion air from the blower 98 in the venturi tubes 104 and 108. The mixture of air and gas is consequently discharged from the end of the tubes 104 and 108 into the hollow interior chamber of each of the burner members 70 and 80 with it being understood that the burners are of conventional design and operation. Electronic ignition devices 93 are located externally of the burner members adjacent the tile members 116 so that actuation of the electronic ignition devices serves to ignite the fuel-air gaseous mixture as it emerges from the small orifice openings 117 in the tile members 116. The orifice openings 117 in the tile members 116 are of approximately 0.0535 inch diameter with approximately 167 of the openings being provided in each square inch of the tile members. The combustion occurs immediately adjacent the outer surface of the tile and serves to heat the outer surface of the tile to a high temperature causing the outer surface to radiate infrared radiation. The pressure of the gas-air mixture on the interior of the burner is sufficient to cause the mixture to move outwardly through the orifice openings at a sufficient velocity as to preclude flashback of the fire through the orifice openings. Additionally, the inner surface of the tile members generally remains fairly cool due to the flow of the gas and air mixture through the orifice openings. Consequently, there is no flashback and the flame remains immediately adjacent the external surface of the tile.

It should be observed that the outer surface of the tile is approximately 0.25 inch from the outer edge of the undulating baffle members 60. Infrared radiation from the outer surface of the tile members 116 consequently impinges on the baffle members 60 and 62 and the outer surface of the internal left wall 38 and the internal right wall 40. A substantial portion of the heat resultant from the combustion of the gas and air mixture is consequently radiated onto the undulating baffle fins 60 and 62 and walls 38 and 40 to consequently heat cooking oil maintained in the vat 16.

Additionally, the flue gases resultant from the combustion of the gas and air mixture impinge on the undulating baffle fins 60 and the outer surfaces of members 38 and 40 so as to effect a further heat transfer from the combustion products by conduction into the oil within the vat 16. As the products of combustion move upwardly in the side draft chambers 63 and 65 beyond the upper extent of the undulating baffle fins 60 and 62 they enter the upper passageway above metal plate 134 and then move rearwardly for exit outwardly through the flue gas discharge opening 138 provided in the rear wall 24. During this rearward movement, the flue gases engage the lower surface of portions 39 and 41 of the vat and the surface of fins 64 and 66 to give up further heat which is conducted into the oil within the vat 16 in a well known manner. The flue gas exiting from the flue discharge opening 138 moves into the stack base chamber 140 and then moves upwardly past the fins 142, 143, and 144 to which it gives up further heat which is conveyed through the rear wall 24 and into the cooking oil within the vat. By the time the flue gas has past beyond the upper surface of fins 142, etc., it has been cooled dramatically to a fairly low temperature at which it is discharged through opening 220. Substantially all of the useful heat has been absorbed from the flue gas at the time it is discharged.

It should be understood that separate control means provided for each burner makes it is possible to operate the system with the use of only one burner for heating the cooking oil on one side of the vat if desired; it is also possible to operate the vat compartments 47 and 49 at different temperatures. Operation of the system is extremely efficient and has proven to have a 65 percent efficiency as compared to prior known systems employing conventional bunsen burners relying upon ambient atmospheric air for effecting combustion which inherently asperate air in excess of that needed for complete combustion and have an efficiency of approximately 40 percent at best. Thus, the instant invention represents a substantial advance in the art by achieving an unexpectedly high efficiency advantage as compared to the prior art devices.

Numerous modifications of the preferred embodiment will undoubtedly occur to those of skill in the art and it should therefore be understood that the invention is not limited to the preferred divided vat embodiment. For example, the divider panels 42, 44, and baffle plate 128 can be eliminated in an alternative embodiment with elements 39 and 41 being extended and joined to provide a single non-compartmented vat to be heated by both burners under the control of single thermostat control means. Thus, the spirit and scope of the invention is to be limited solely by the appended claims.

We claim:

1. A deep fat fryer comprising a vat for receiving cooking oil and infrared type gas burner means associated with and adjacent said vat, means for providing fuel gas and air to said burner means with the air being in an amount substantially no greater than that necessary for complete combustion to occur to effect the heating of said vat and cooking oil therein by applying heat to the vat with a substantial portion of the heat being applied in the form of radiant heat with a minimum amount of heat being lost to the heating of excess combustion air and baffle means defining a tortuous path for the discharge of the combustion gases from the gas burner means in heat exchange relation to the vat, wherein said vat is of generally inverted U-shape including a front-to-rear extending tunnel having sides defined by mutually facing spaced first and second internal walls and additionally including first and second burner clamp means respectively extending inwardly from lower areas of said first and second internal walls and wherein said infrared gas burner means includes first and second gas burner units respectively supported on, and held by, said first and second burner clamp means and each gas burner unit has apertured means respectively having outer surfaces spaced from but each facing an outer surface of one of said internal walls to define a generally vertically extending side draft chamber therebetween with combustion occurring adjacent said apertured means for heating the outer surface thereof to cause the outer surface to emit substantial quantities of infrared radiation which impinges on the internal walls.

2. A deep fat fryer as set forth in claim 1 wherein said outer surface of said first and second inner walls is coated with black infrared radiation absorbing material.

3. A deep fat fryer as set forth in claim 2 wherein said baffle means includes a plurality of undulating fin members extending outwardly from the outer surfaces of said inner walls.

4. A deep fat fryer as set forth in claim 3 additionally including upper inwardly inclined portions of said inner walls and further sheet means defining an upper front-to-rear extending generally horizontal flue gas discharge passageway extending above said first and second burners in communication with the upper ends of said side draft chambers along side edge portions of said horizontal flue gas discharge passageway means for conducting flue gas therefrom in heat exchange relationship with said upper inwardly inclined portions of said inner walls.

5. A deep fat fryer as set forth in claim 4 wherein said heat absorbing baffle fins extend in generally vertical orientation from top to bottom of said side draft chambers and are formed of canted inclined portions defining a tortious gas flow path between adjacent ones of said baffle fins.

6. A deep fat fryer as set forth in claim 4 additionally including upper heat absorbing baffle fins extending downwardly into said horizontal flue gas discharge passageway from said upper inwardly inclined portions of said inner walls.

7. A deep fat fryer as set forth in claim 6 additionally including divider baffle plate means extending along the length of said horizontal flue gas discharge passageway means centrally thereof dividing the passageway into first and second horizontal passageways of approximately the same volume.

8. A deep fat fryer as set forth in claim 7 additionally including front-to-rear extending divider wall means dividing said vat into two compartments of approximately equal size with each compartment being heated respectively by one of said infrared gas burner means.

9. A deep fat fryer as set forth in claim 8 wherein said divider wall means comprises first and second spaced plates between which an air space is located and further including a vertically extending flue box assembly communicating with the rear end of said horizontal flue gas discharge passageway.

10. A deep fat fryer as set forth in claim 1 wherein said apertured means comprise apertured tile means.

11. A deep fat fryer as set forth in claim 10 wherein said baffle means includes a plurality of zig-zag fin members extending outwardly from the outer surfaces of said inner walls said means for providing fuel gas and air comprises an electric blower connected to a gas venturi tube means extending into said gas burner units.

12. A deep fat fryer as set forth in claim 11 additionally including upper inclined portions of said inner walls and further sheet means defining an upper front-to-rear extending generally horizontal flue gas discharge passageway means extending above said first and second burners in communication with the upper ends of said side draft chambers along side edge portions of said horizontal flue gas discharge passageway means for conducting flue gas therefrom in heat exchange relationship with said upper inwardly inclined portions of said inner walls and additionally including heat absorbing baffle fin members extending outwardly of said inner walls into said side draft chambers.

13. A deep fat fryer as set forth in claim 12 additionally including upper heat absorbing baffle fins extending downwardly into said horizontal flue gas discharge passageway from said upper inwardly inclined portions of said inner walls.

14. A deep fat fryer as set forth in claim 13 additionally including divider baffle plate means extending along the length of said horizontal flue gas discharge passageway means centrally thereof dividing said passageway into first and second horizontal passageways of approximately the same volume.

15. A deep fat fryer as set forth in claim 11 wherein said further sheet means comprises an upper metal sheet horizontally positioned beneath said upper inwardly inclined portions of said inner walls.

16. A deep fat fryer as set forth in claim 15 additionally including an insulation panel provided on the lower side of said upper metal sheet and side flanges provided along opposite side edges of said upper metal sheet for receiving and holding upper edge portions of said gas burner units.

* * * * *